United States Patent
Venkataraman et al.

(10) Patent No.: US 8,354,461 B2
(45) Date of Patent: Jan. 15, 2013

(54) FOAMABLE FLUOROPOLYMER COMPOSITION

(75) Inventors: Sundar Kilnagar Venkataraman, Avondale, PA (US); Robert Thomas Young, Newark, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 46 days.

(21) Appl. No.: 12/409,834

(22) Filed: Mar. 24, 2009

(65) Prior Publication Data

US 2009/0186956 A1    Jul. 23, 2009

Related U.S. Application Data

(63) Continuation of application No. 11/959,617, filed on Dec. 19, 2007, now abandoned.

(60) Provisional application No. 60/876,219, filed on Dec. 21, 2006.

(51) Int. Cl.
   *C08K 3/38*   (2006.01)

(52) U.S. Cl. ........ 524/165; 524/404; 524/405; 524/546; 521/79; 521/85

(58) Field of Classification Search ............ 521/50, 521/79, 85; 524/404, 546, 165, 405
   See application file for complete search history.

(56) References Cited

U.S. PATENT DOCUMENTS

| | | | |
|---|---|---|---|
| 4,743,658 A | 5/1988 | Imbalzano et al. | |
| 4,764,538 A | 8/1988 | Buckmaster et al. | |
| 4,877,815 A | 10/1989 | Buckmaster et al. | |
| 5,182,342 A | 1/1993 | Feiring et al. | |
| 5,397,829 A * | 3/1995 | Morgan et al. | 524/463 |
| 5,571,462 A * | 11/1996 | Hashimoto et al. | 264/45.9 |
| 5,610,203 A | 3/1997 | Buckmaster et al. | |
| 5,677,404 A | 10/1997 | Blair | |
| 5,726,214 A | 3/1998 | Buckmaster et al. | |
| 5,885,494 A | 3/1999 | Venkataraman et al. | |
| 6,180,721 B1 | 1/2001 | Rogestedt et al. | |
| 6,284,810 B1 | 9/2001 | Burnham et al. | |
| 6,623,680 B2 * | 9/2003 | Kaulbach et al. | 264/171.14 |
| 6,838,545 B2 * | 1/2005 | Chapman et al. | 528/480 |
| 8,153,701 B2 * | 4/2012 | Venkataraman et al. | 521/79 |
| 2002/0156139 A1 * | 10/2002 | Hrivnak | 521/85 |
| 2004/0198886 A1 | 10/2004 | Shiotsuki et al. | |

* cited by examiner

*Primary Examiner* — Nicole M Buie-Hatcher

(57) ABSTRACT

The present invention discloses a foamable composition. The foamable composition includes a partially-crystalline melt processible perfluoropolymer and a foam nucleating package. The foamable composition has a uniform foam cell size where the foam cell size of at least 90% of the foamed cells is 50 micrometers or less. The foam nucleating package ranges from 0.1 to 10 wt % of the combined weight of the perfluoropolymer and the foam nucleating package.

10 Claims, 3 Drawing Sheets

FOAMABLE FLUOROPOLYMER COMPOSITION

FIELD OF THE INVENTION

The present invention relates to a foamed thermoplastic polymer. More particularly, the present invention relates to a foamed thermoplastic polymer composition that combines a foam nucleating package with a high melt flow fluoropolymer.

BACKGROUND OF THE INVENTION

There are a variety of problems faced by manufacturers who use fluoropolymers for foamed insulation, (e.g. insulated conductor manufacturers), that are not resolved by currently available conductor insulation materials. One such problem for these manufacturers is that the extrusion/melt draw-down process is carried out under a variety of conditions and parameters, resulting in variation of the physical and electrical characteristics of the foamed fluoropolymer for the manufacturers. The manufacturers seek to minimize the variation of the foamed fluoropolymer characteristics.

Another concern of the manufacturers is the economics of extruding the fluoropolymer for a variety of uses. Faced with the onset of insulation quality (spark and/or lump) problems, and at least the uncertainty of changing draw down ratio (DDR), operating temperatures, and cone length, insulated conductor manufacturers typically reduce line speed until the desired quality of the insulated conductor is achieved, which results in a loss of productivity.

The following disclosures may be relevant to various aspects of the present invention and may be briefly summarized as follows:

U.S. Pat. No. 4,764,538 to Buckmaster et al. discloses synergistic combinations of boron nitride (BN) and certain inorganic salts which provide enhanced foam nucleation in fluoropolymers.

U.S. Pat. No. 4,877,815 to Buckmaster et al. discloses a class of sulfonic and phosphonic acids, and salts of the acids which give very efficient foam cell nucleation in a wide variety of thermoplastic materials at low concentrations. Additionally, these acids and salts are beneficially used in minor amounts in conjunction with boron nitride and calcium tetraborate together, i.e. a combination covered by U.S. Pat. No. 4,764,538. The above-mentioned patents do not disclose compositions that provide the desired insulation crush resistance and electrical performance while extruding at high speeds sought by manufacturers such as insulated conductor manufacturers.

It is desirable to provide a foam structure which reduces variation in the processing and electrical performance of the finished product. It is further desirable to provide a composition that is foamable enabling the reduction of the amount of polymer material required for applications such as cable applications. It is also desirable to have a foamable fluoropolymer composition that can be extruded at higher speeds than presently possible with commercial polymer without risking quality, loss of productivity or desirable characteristics such as the electrical properties of an insulated conductor.

SUMMARY OF THE INVENTION

Briefly stated, and in accordance with one aspect of the present invention, there is provided a foamable composition comprising: a) a partially-crystalline melt-processible perfluoropolymer and b) a foam nucleating package comprising a uniform foam cell size wherein the foam cell size of 90% of the foamed cells is 50 micrometers or less, and the foam nucleating package ranges from 0.1-10 wt % of the combined weight of the perfluoropolymer and the foam nucleating package.

Pursuant to another aspect of the present invention, there is provided a foamable composition comprising: a) a partially-crystalline melt-processible perfluoropolymer, wherein said perfluoropolymer is fluorinated in the melt and b) a foam nucleating package comprising:
i) boron nitride,
ii) a synergistic amount of at least one inorganic salt that is thermally stable at the fluoropolymer extrusion temperature, and consists of a metal cation and a polyatomic anion, and satisfies the relationship:

$$0.36 \times [14-pKa] - 0.52 \geq [r-0.2q]/2 \geq 0.11 \times [14-pKa] - 0.28$$

where
R=crystal ionic radius of the cation, in Angstroms
Q=valence of the cation
pKa=−log of Ka for the following reaction

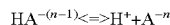

where A is the salt anion, H is hydrogen, and n=absolute value of the valence of the anion; and
iii) a foam nucleating agent of the formula

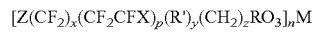

wherein:
Z is $CCl_3$, $CCl_2H$, H, F, Cl or Br;
each X, independently, is selected from H, F or Cl;
R is sulfur or phosphorus; M is H or a metallic, ammonium, substituted ammonium or quaternary ammonium cation;
x is an integer and is 0 to 10;
p is an integer and is 0 to 6;
y is 0 or 1;
z is an integer and is 0 to 10;
x+y+z+p is a positive integer or, if x+y+z+p is 0, Z is $CCl_3$ or $CCl_2H$;
n is the valence of M; and
R' is selected from
a $C_{5-6}$ perfluorinated alicyclic ring diradical;
a $C_{1-16}$ perfluorinated aliphatic polyether diradical with repeat units selected from [$CF_2O$], [$CF_2CF_2O$], and [$CF_2CF(CF_3)O$]; and
a substituted or unsubstituted aromatic diradical, in which case, Z is H and said foam nucleating package ranges from 0.1-10 wt % of the combined weight of said perfluoropolymer and said foam nucleating package.

BRIEF DESCRIPTION OF THE DRAWINGS

The invention will be more fully understood from the following detailed description, taken in connection with the accompanying drawings, in which.

Figure 1A:
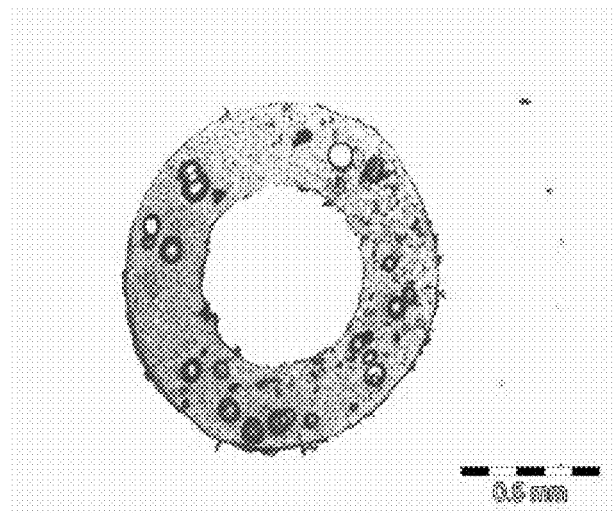
FIG. 1(a) shows a topical view of the morphology of a commercially available foamed sample containing void contents of ~15% at a magnification of 75×.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Definitions:

The following definitions are provided as reference in accordance with how they are used in the context of this specification and the accompanying claims.

Cat 5/5e, also known as Category 5/5e cable, is an unshielded twisted pair (UTP) cable type designed to reliably carry data up to 100 Mbit/s, e.g. 100BASE-T. Cat 5/5e includes four twisted pairs in a single cable jacket each with three twists per inch of insulated 24 gauge copper wire. The twisting of the cable reduces electrical interference and crosstalk. Another important characteristic is that the wires are insulated with a plastic (e.g. FEP) that has low dispersion, that is, the dielectric constant does not vary greatly with frequency. Special attention also has to be paid to minimizing impedance mismatches at the connection points. Cat 5e cable, which superseded Cat 5, is an enhanced version of Cat 5 that adds specifications for far-end crosstalk.

Cat 6, also known as Category 6 cable, is an UTP cable type designed to reliably carry data up to 1 Gbit/s. It is noted that Cat 6 is backward compatible with the Cat 5/5e and Cat 3 standards but with more stringent specifications for crosstalk and system noise. Cat 6 includes four twisted pairs in a single cable jacket each with different twists per inch of insulated 23 gauge copper wire. The cable standard is suitable for 10BASE-T/100BASE-T and 1000BASE-T.

Cat 7, also known as Category 7 cable, is a shielded twisted pair cable designed to reliably carry data up to 10 Gbit/s. Note that Cat 7 is backward compatible with Cat 6, Cat 5/5e and Cat 3 (i.e. category 3 being the first unshielded twisted pair cable suitable for 100 meter transmission of ethernet signals) standards with even more stringent specifications for crosstalk and system noise. Cat 7 includes four twisted pairs, just like the earlier standards except that shielding has been added for the individual twisted pairs and for the cable as a whole.

Crosstalk is the unwanted transfer of energy from one signal path coupled to an adjacent or nearby signal path. An example of cross-talk would be the faint voices sometimes experienced during a phone conversation. Crosstalk can be capacitive, electric field, or inductive, magnetic field, and normally creates unwanted or erroneous data within a computer link or data system.

Dielectric constant, $\in_r$, is a physical quantity that describes how a material affects an electric field and is related to the ability of the material to polarize and partially cancel the field. More specifically, it is the ratio of the amount of electrical energy stored to that of a vacuum, $\in_r = 1$. The $\in_r$ of the wire insulation effects both the cable impedance and propagation velocity.

Shielded twisted pair (STP) cabling is primarily used for computer networking. Each twisted pair is formed by two insulated conductors wound around each other and covered with a conducting overwrap to protect the wire from interference and serves as a ground. This extra protection limits the wire's flexibility and makes STP more expensive than other cable types. Each conductor is surrounded by insulation. A conductive shield may surround a twisted pair. Multiple twisted pairs are encased in a sheath. The sheath may include a conductive shield. These shields include foil wrapper or wire braid.

Uniform twisted pair is one in which the circular twist is constant along the length of the twisted pair.

Unshielded twisted pair (UTP) cabling is the primary wire type for telephone usage and is also common for computer networking. Each twisted pair is formed by two insulated conductors wound around each other for the purposes of canceling out electromagnetic interference which can cause crosstalk. Twisting wires decreases interference because: the loop area between the wires (which determines the magnetic coupling into the signal) is reduced; and because the directions of current generated by a uniform coupled magnetic field is reversed for every twist, canceling each other out. The greater the number of twists per meter, the more crosstalk is reduced. The conductors are each surrounded by insulation. Multiple twisted pairs are encased in a sheath.

Reference is now made to the detailed description of the present invention including but not limited to the embodiments disclosed herein. The present invention provides a composition comprised of a partially-crystalline melt-processible fluoropolymer and a foam nucleating package. The fluoropolymers according to this invention are partially crystalline; i.e. they are not amorphous, e.g. they are not elastomers. By partially crystalline is meant that the polymers have some crystallinity and are characterized by a detectable melting point measured according to ASTM D 3418, and a melting endotherm of at least about 3 J/g. They are copolymers of tetrafluoroethylene (TFE) and hexafluoropropylene (HFP), and copolymers of TFE and perfluoro(alkyl vinyl ether). Copolymers are defined herein as polymers made by polymerizing two or more monomers.

A preferred fluoropolymer of the present invention is perfluoropolymer. The perfluoropolymer is preferably made by polymerizing TFE, HFP and perfluoro(alkyl vinyl ether). The HFP ranges from about 3 to 20 weight percent of the perfluoropolymer. The perfluoropolymer is fluorinated in the melt and is substantially free of metal ions. The perfluoropolymer is polymerized and isolated without the use of metal ion containing reagents. The perfluoropolymer comprises from about 0.5 to 10 weight percent of at least one perfluoro(alkyl vinyl ether). An embodiment of the perfluoro(alkyl vinyl ether) (PAVE) comprises perfluoro(ethyl vinyl ether) (PEVE), perfluoro(propyl vinyl ether) (PPVE), or perfluoro (methyl vinyl ether) (PMVE).

Another preferred perfluoropolymer is the copolymer of TFE with perfluoro(alkyl vinyl ether) (PAVE) in which the linear or branched alkyl group contains 1 to 5 carbon atoms. Preferred PAVE monomers include perfluoro(methyl vinyl ether) (PMVE), perfluoro(ethyl vinyl ether) (PEVE), perfluoro(propyl vinyl ether) (PPVE), and perfluoro(butyl vinyl ether) (PBVE). The copolymer can be made using several PAVE monomers, such as the TFE/perfluoro(methyl vinyl ether)/perfluoro(propyl vinyl ether) copolymer, sometimes called MFA by the manufacturer. TFE/PAVE copolymers, generally known as PFA, have at least about 2 wt % PAVE, including when the PAVE is PPVE or PEVE, and will typically contain about 2-15 wt % PAVE. When PAVE includes PMVE, the composition is about 0.5-13 wt % perfluoro(m- ethyl vinyl ether) and about 0.5 to 3 wt % PPVE, the remainder to total 100 wt % being TFE, and as stated above, may be referred to as MFA.

Polymerization is conducted in the absence of added alkali metal salts. The general procedure of Example 1 of U.S. Pat. No. 5,677,404 is followed. However, the initiator is made up with only ammonium persulfate. Potassium persulfate, a common alternative initiator or co-initiator with ammonium persulfate, is not used. It is also possible to use organic initiators as disclosed in U.S. Pat. No. 5,182,342. The water for polymerization and washing is deionized. In the above-mentioned Example 1, the copolymer is TFE/HFP/PEVE, though PPVE, PMVE, and other PAVE monomers, and combinations of these monomers, can be substituted. Melt flow rate (MFR) is controlled by the rate of addition of initiator to the polymerization. The perfluoropolymer of the present invention preferably has an MFR ranging from about 25 g/10 min to 35 g/10 min. After polymerization, the resulting polymer dispersion is coagulated by mechanical agitation. Coagulation may also be done by freezing and thawing, or by chemical addition. Acids or ammonium salts may be used in chemical coagulation, but metal salts, particularly alkali metal salts may not. It is further preferred that alkaline earth metal salts not be used in the process, for example as coagulants, and that materials of construction of polymerization and processing equipment be chosen so that corrosion will not be a source of metal ions. The alkali metal ion content of the polymer is measured by x-ray fluorescence. For potassium as the analyte, the lower detection limit is 5 ppm in the polymer. Polymer according to this invention has less than 50 ppm alkali metal ion, preferably less than about 25 ppm, more preferably less than about 10 ppm, and most preferably about less than about 5 ppm.

Polymers made using deionized water and polymerized and isolated without the use of alkali metal salts are referred to herein as being substantially metal ion free (e.g. metal salt-free).

It has been found that at high line speed in the conductor coating operation, the presence of alkali metal salt in the fluoropolymer promotes the formation of fluoropolymer drool on the outer surface of the extrusion die and/or on the guider tip that is inside the die, through which the conductor passes, and this drool is periodically carried along the melt cone to the insulation on the conductor to appear as unacceptable lumps of insulation. This is not the only source of lumps. Too high or too low polymer melt temperature can also cause lumps. The presence of alkali metal salt in the fluoropolymer contributes to the lump problem. The copolymer of the present invention is free of, i.e. does not contain, alkali metal salt in the sense that no alkali metal salt is used in the polymerization or in the isolation of the resulting fluoropolymer.

The method of determination of alkali metal ion in the polymer can be illustrated by way of example of the determination of potassium ion. The analytical method is x-ray fluorescence (XRF). The XRF instrument is standardized with polymer containing known amounts of potassium ion. The zero ppm standard is made by polymerization in a potassium-ion free environment and with a potassium-free recipe. For standards at other concentrations, the absolute values of potassium ion content are determined by proton induced x-ray emission (PIXE).

Polymers according to this invention can be fluorinated by the method disclosed in U.S. Pat. No. 4,743,658 to convert thermally or hydrolytically unstable end groups to the stable —$CF_3$ endgroup. By thermally unstable is meant that the endgroup reacts, usually by decomposition, at temperatures at which fluoropolymers are melt-processed, generally between 300 and 400° C. Examples of unstable endgroups affected by the fluorine treatment are —$CF_2CH_2OH$, —$CONH_2$, —COF, and —COOH. Fluorination is conducted so as to reduce the total number of the four types of unstable endgroups to no greater than about $50/10^6$ carbon atoms in the polymer backbone. Preferably, the sum of these unstable endgroups after fluorine treatment is no greater than about $20/10^6$ carbon atoms, and with respect to the first three-named endgroups, preferably less than about 6 such endgroups/$10^6$ carbon atoms. The fluorine treatment is followed by the sparging, e.g. with nitrogen gas, of the fluorine-treated pellets as disclosed in U.S. Pat. No. 4,743,658, to rid the fluoropolymer of extractable fluoride. A preferred method of fluorination is described in U.S. Pat. No. 6,838,545 wherein polymer is fluorinated in the melt. That is, the polymer is molten when exposed to fluorine.

The foam nucleating package of the present invention provides a uniform foam cell size. By cell size is meant the diameter of the cell, the cells being spherical or nearly so. If the cells are significantly out of round, i.e. tending toward elliptical, the size is the longer dimension as it appears under the microscope. The average cell size is less than 10% of the thickness of the foamed insulation. Preferably, about 90% of the foamed cells are 50 micrometers or less. The foam nucleating package ranges from preferably 0.1 to 10 weight %, more preferably 0.1 to 5 wt %, and most preferably 0.1 to 0.6 wt %, of the total weight % of the melt-processible fluoropolymer and the foam nucleating package.

Foam nucleating agents are thermally stable compounds selected from the group consisting of sulfonic and phosphonic acids and salts thereof. Preferably, (a) free acids and salts of partially or totally fluorinated aliphatic sulfonic and phosphonic acids, which may contain cycloalkyl groups and/or ether oxygen; and (b) free acids and salts of aromatic sulfonic and phosphonic acids, in which the aromatic ring, optionally, is substituted with alkyl, fluorine-containing alkyl, and/or hydroxyl groups.

Among foam nucleating agents that may constitute, or may be components of, the foam nucleating package are the foam nucleating agents represented by the formula

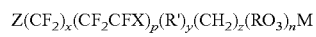

wherein: the bivalent groups, except for $RO_3$, may be present in any sequence;

Z is selected from $CCl_3$, $CCl_2H$, H, F, Cl, and Br;

each X, independently, is selected from H, F, Cl and $CF_3$;

R is selected from sulfur and phosphorus;

M is selected from H and a metallic, ammonium, substituted ammonium and quaternary ammonium cation;

each of x and z, independently, is an integer and is 0 to 20;

p is an integer and is 0 to 6;

y is 0 or 1;

x+y+z+p is a positive integer or, if x+y+z+p is 0, then Z is $CCl_3$ or $CCl_2H$;

n is the valence of M; and

R' is selected from a $C_{5-6}$ perfluorinated alicyclic ring diradical;

a $C_{1-16}$ perfluorinated aliphatic polyether diradical with repeat units selected from [$CF_2O$], [$CF_2CF_2O$], and [$CF_2CF(CF_3)O$]; and a substituted or unsubstituted aromatic diradical, in which case, Z is H.

A foam nucleating agent of the present invention has a foam nucleating effective amount of at least one thermally stable compound selected from sulfonic and phosphonic acids and/or salts thereof. Examples of foam nucleating agents are provided in Table 1. "TBSA" is $F(CF_2)_n CH_2CH_2SO_3H$ wherein n is 6, 8, 10, and possibly 12, being predominately 8.

TABLE 1

| | |
|---|---|
| ZrS-10 | zirconium (+4) salt of TBSA |
| CrS-10 | chromium (+3) salt of TBSA |
| CeS-10 | cerium (+4) salt of TBSA |
| KS-10 | potassium salt of TBSA |
| HS-10 | TBSA |
| AS-10 | aluminum salt of TBSA |
| SrS-10 | strontium salt of TBSA |
| CaS-10 | calcium salt of TBSA |
| ZnS-10 | zinc salt of TBSA |
| BaS-10 | barium salt of TBSA |
| LS-10 | lithium salt of TBSA |
| FS-10 | iron (+3) salt of TBSA |
| TEAS-10 | triethylamine salt of TBSA |
| BS-6A | barium p-(perfluoro[1,3-dimethylbutyl]) benzene sulfonate |
| BS-9A | barium p-(perfluoro[1,3,5-trimethylhexyl]) benzene sulfonate |
| BaS-A1(H) | barium p-toluene sulfonate |
| BaP-A | barium benzene phosphonate |
| NaP-A | sodium benzene phosphonate |
| NaS-A(II) | 4,5-dihydroxy-m-benzene disulfonic acid disodium salt |
| NaS-6 | sodium perfluorohexane sulfonate |
| BS-6 | barium perfluorohexane sulfonate |
| BS-8 | barium perfluorooctane sulfonate |
| KS-6 | potassium perfluorohexane sulfonate |
| KS-8 | potassium perfluorooctane sulfonate |
| KS-8C | potassium perfluorocyclohexylethane sulfonate |
| NaS-1 | sodium trifluoromethane sulfonate |
| KS-1 | potassium trifluoromethane sulfonate |
| KS-1(H) | potassium methane sulfonate |
| BaS-3(H) | barium propane sulfonate |
| NaTCA | sodium trichloroacetate |
| BTBP | barium salt of $F(CF_2)_n CH_2CH_2PO_3H$ wherein n is a mixture of 6, 8, 10 and possibly 12, predominantly 8 |
| NTBP | sodium salt of $F(CF_2)_n CH_2CH_2PO_3H$ wherein n is a mixture of 6, 8, 10 and possibly 12, predominantly 8 |
| LL1121B | barium perfluoro(2,5-dimethyl)-3,6-dioxatridecanoate |
| BC14(06) | barium perfluoro 3,5,7,9,11,13-hexaoxatetradecanoate |
| BS-12(H) | barium lauryl sulfate |
| NS-12(H) | sodium lauryl sulfate |
| CC-18(H) | calcium stearate |
| BaC-8 | barium perfluorooctanoate |
| BaC-9 | barium perfluorononanoate |
| AWG-26 | Solid copper wire 404 micrometers in diameter |
| AWG-24 | Solid copper wire 510 micrometers in diameter |
| AWG-22 | Solid copper wire 635 micrometers in diameter |

The foamed product, e.g. insulation of the foamable composition of the present invention comprises a tensile strength of at least 2000 psi (13.8 MPa) and an elongation of at least 200% and more preferably 250%.

An advantage of the present invention is the electrical properties, specifically, the reduction in dielectric of foamed wire insulation. Speed of signal transmission in insulated conductors is inversely related to the square root of the insulation dielectric. Perfluoropolymer has a dielectric of about 2. Foaming, which introduces air (dielectric=1) into the insulation, reduces the insulation dielectric in proportion to the void content. Therefore, foamed insulation, in addition to its other advantages, permits faster signal transmission.

The composition of the present invention provides an insulated conductor that has a capacitance coefficient of variation (COV) of no greater than 1%. The COV is the standard deviation divided by the mean, expressed as a percentage. Table 2 shows the COV data from Example 1 for an embodiment of the present invention.

EXAMPLE 1

Sample Preparation and Process Description

A triple foam nucleating package of the present invention comprised of boron nitride (91.1±0.5 wt %), calcium tetraborate (2.5±0.2 wt %) and Zonyl® BAS (6.4±0.2 wt %) was used. This foam nucleating package was compounded into Teflon® FEP TE9494 fluoropolymer (manufactured E.I. du Pont de Nemours & Co., Wilmington, Del.), a TFE/HFP/PEVE perfluoropolymer with a melt flow rate (MFR) ~30 g/10 min. to form a master batch having a boron nitride content of approximately 4 wt % of the resultant composition. Teflon® FEP TE9494 fluoropolymer is fluorinated in the melt and is substantially free of metal ions. The concentration of unstable endgroups —$CF_2CH_2OH$, —$CONH_2$, —COF, and —COOH is less than 20 per million carbon atoms. Pellets were formed via compounding operations performed on a Kombi-plast extruder consisting of a 28 mm twin-screw extruder and a 38 mm single screw extruder. The master batch pellets and pellets of the base fluoropolymer (Teflon® FEP TE9494) were dry blended at a ratio of 1:9 to form a foamed thermoplastic composition which was subsequently fed to a Nokia-Maillefer 45 mm extrusion wire-line to extrude insulation onto AWG 23 solid copper conductor (22.6 mil (0.57 mm)). The extruder had a length/diameter ratio of 30:1 and was equipped with a mixing screw in order to provide uniform temperature and dispersion of nitrogen into the melt.

The foamed thermoplastic composition material was extruded onto wire at a speed of ~1000 ft/min (300 m/min) to produce an insulation ~7.9 mils (~0.20 mm) in thickness having void contents ranging from 15 to 35 wt %. Die and guider tip combinations that typically yielded draw down ratios (cross-sectional area of the die area/cross-sectional area of the finished extrudate) of 30 to 40 were utilized.

TABLE 2

| Estimated % Voids | Capacitance COV | Diameter COV | Spark Count (kV, #) |
|---|---|---|---|
| ~14 | 0.30% | 0.34% | 1.5, 2 |
| ~14 | 0.33% | 0.34% | 2.5, 0 |
| ~24 | 0.29% | 0.29% | 2.5, 7 |
| ~24 | 0.32% | 0.29% | 2.5, 2 |
| ~27 | 0.48% | 0.36% | 2.5, 7 |
| ~27 | 0.45% | 0.36% | 2.5, 8 |
| ~35 | 0.48% | 0.52% | 1.0, 4 |
| ~35 | 0.43% | 0.47% | 1.5, 7 |
| ~35 | 0.44% | 0.34% | 1.5, 2 |

The capacitance coefficient of variation in Table 2 is calculated by dividing the capacitance standard deviation by the capacitance average. The foamable composition of the present invention has a void content ranging from 10-50%, and more preferably ranges from 15-35 % void content.

Void content of the foamed insulation is calculated from the equation:

$$\text{Void Content (\%)} = 100 \times (1 - d \text{ (foamed)}/d \text{ (unfoamed)})$$

The density of the foamed insulation is determined by cutting a length of insulated conductor, removing the insulation, measuring the volume in cubic centimeters of the insulation and dividing that value into the weight in grams of the insulation. The density is the average of measurements of at least 5 samples, each being ~30 cm in length. The density of the unfoamed insulation is 2.15.

The spark count of the Table 2 is shown for 20,000 ft (6100 m) reels. The spark count is determined by dividing the number of sparks (shown in the last column of Table 2) by 20 which yields a spark count of less than one spark per 1000 feet (300 m) of cable.

Figure 1B:
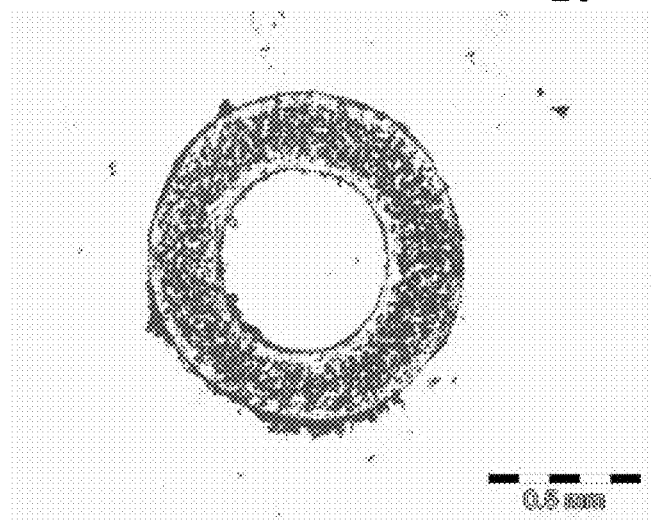
FIG. 1(b) shows a topical view of the morphology of the present invention of a foamed sample containing void contents of ~22% at a magnification of 75×.

Reference is now made to the Figures. FIGS. 1(a) and 1(b), show cross-sections of samples of insulation stripped away from the conductor (i.e. wire). FIG. 1(a) shows a commercially available sample of a foamed thermoplastic with about a 15% void content. The insulation has an approximate outer diameter of 0.045 inches (1.14 mm) and an inner diameter of 0.022 inches (0.56 mm). As can be seen in the FIG. 1(a) there are a variety of large bubbles 10 clearly visible at a magnification of 75× in the morphology of this foamed sample. These large bubbles, showing non-uniform foam cell structure, are more clearly visible in a 295× magnification of FIG. 1(a). There is also a lack of uniform foam cell structure of the FIG. 1(a) cell structure. FIG. 1(b) shows a foamed sample of the composition of the present invention using 0.4% foam nucleating agent. This sample has a void content of about 22%. The insulation sample has an outer diameter of 0.0427 inches (1.085 mm) and an inner diameter of approximately 0.0226 inches (0.574 mm). In contrast to FIG. 1(a), FIG. 1(b) does not disclose large bubbles in the foamed sample at 75× magnification but rather uniform foam cell structure 20. Even at 295× magnification (FIG. 1(d)), there are no large bubbles visible in the foamed sample. The uniformity of the cell structure of the present invention enables the maintaining or improvement in electrical characteristics and crush resistance of the present invention over other commercially available insulated conductors. Furthermore, it is additionally beneficial if the foam cells are distributed toward the center of the insulation (in the thickness direction) and away from the surfaces of the insulation. Surprisingly, the foamable composition of this invention provides centrally distributed foam cells. This centralization of the foam cells has the additional benefit of promoting the formation of "skin", that is relatively low to no foam content regions of the insulation at and near the insulation surfaces.

Because of this promotion of skin formation, the composition of the present invention can also be self-skinning. The self-skinning improves the interior surface of the insulation surface by providing a continuous layer or coating of fluoropolymer on the metal conductor. This continuous layer or coating of fluoropolymer is provided by preventing discontinuity of fluoropolymer that is in contact with the conductor caused by foam cells opening directly to the metal conductor. For example, prevention of foam extending to the conductor surface reduces variation of the dielectric thus, providing better electrical properties of an insulated conductor. The void content affects the self-skinning.

By "skin" in foamed insulation is meant a relatively unfoamed (relatively free of void content) region extending from the inner or the outer surface of the insulation to a depth that is a fraction of the shortest distance between the inner and outer surfaces. Specifically, the skin in the present invention has less than about 50% the void content of the insulation as a whole, preferably less than about 25% the void content, and more preferably less than about 20% the void content and most preferably less than 10% of the void content of the insulation as a whole. The skin extends from the surface of the insulation into the interior of the insulation at least about 5% of the shortest distance between the inner and outer surfaces of the insulation, preferably at least about 7%, more preferably at least about 10%, and still more preferably at least about 15%. The skin on the outer surface of the insulation need not be of the same void content or thickness as the skin on the inside of the insulation.

Void content of the skin region is determined by examination of a cross section of the insulation under a microscope or from analysis of a photograph taken with a microscope. The cross section should be about 0.1 mm thick. The voids appear circular in cross section and a representative number are measured and their area divided by the total area in which the measured voids reside.

A surprising aspect of the foamable composition of the present invention is that it could be extruded at 1000 ft/min (300 m/min). Commercial foamed structures such as that shown in FIG. 1(a) could at most be extruded at up to 500 ft/min (150 m/min). Attempts to increase extrusion rate resulted in the insulation having a rough and sometimes pitted surface, an unacceptable condition for saleable product. In contrast, commercial solid, i.e. unfoamed, fluoropolymer wire insulation can be extruded at 1000 ft/min (300 m/min) or greater, producing good quality insulated wire. The problems seen with commercial foamable compositions when extrusion speeds exceed 500 ft/min (150 m/min) are due to the foam cells being too near the surface of the extruded insulation, the thin layer of polymer separating these too-close cells not being strong enough to resist tearing or breaking when extrusion speed is too great. The foamed insulation formed by the composition of the present invention can be extruded faster because the foam cells are concentrated toward the center of the insulation, more distant from the surfaces, resulting in the formation of a skin, as described above. The skin, having a much lower void content is more like unfoamed insulation. It is believed that this is the reason the foamable composition of the present invention can be extruded at rates more like those possible with unfoamed insulation as opposed the lower rates of commercial foamable compositions.

Figure 1C:
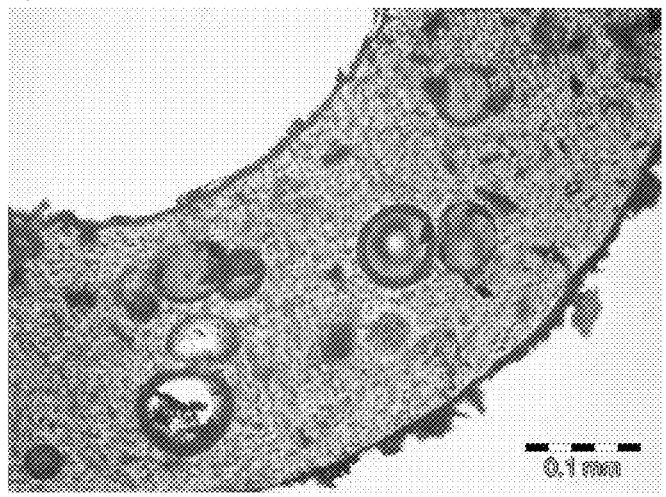
FIGS. 1(c) shows an enlarged sectional view (magnification of 295×), of the cross-sectional topical view of 1(a).
Figure 1D:
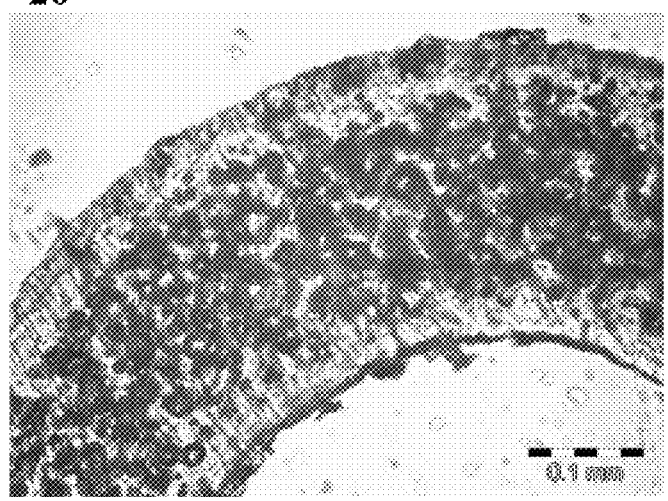
FIGS. 1(d) shows an enlarged sectional view (magnification of 295×) of the cross-sectional topical view of 1(b).

Referring again to FIGS. 1(c) and 1(d). FIG. 1(d) shows the centralization of the voids which enables a more uniform surface on the exterior surface and interior surface (surface closest to the conductor) of the insulation. This provides greater self-skinning. In comparison to the prior art shown in FIG. 1(c) which displays non uniform cells and the lack of uniform cell centralization. This morphology prevents the formation of a continuous structure (skin) at the interior insulation surface near the conductor and on the insulation exterior surface. Both affect the variability of the electrical properties of the insulated conductor. The lack of continuous structure in the interior, i.e. at the interface with the conductor, exposed the conductor to variations in the dielectric, which in turn leads to variation in electrical properties. Uniformity in the insulation exterior surface is beneficial as described below.

In the present invention, a foamable composition is provided that comprises uniform small foam cell size when the composition is extruded into an insulation material, for example, for a conductor forming an insulated conductor. This insulated conductor can be used in cable as one or more twisted pairs which include unshielded twisted pairs and/or shielded twisted pairs. The foamable composition of the present invention enables higher extrusion speeds without reduction in the properties of the insulated conductor thus providing a cost savings to cable manufacturers. The uniform foam cell size also provides crush resistance, that is, uniform compressibility, to the insulated conductor.

The twinning process provides forces on the insulation which tend to crush the foam cells. When two insulated conductors are twisted together, or twinned, to form a twisted pair, the twinning process exerts compressive forces on the insulation. The insulated conductors used in high performance cables typically have tighter twists, thereby experiencing higher compressive forces. A foamed insulation will typically be more compressible than an unfoamed insulation made with the same material, thereby experiencing somewhat higher crushing on twinning. The crushing can be mitigated by modifying the twinning conditions, for example, by reducing the twinning speed, tension applied, etc. The crushing can also be mitigated by compensating for it while designing the cable, for example, by increasing the diameter of the insulation. The electrical properties of the cable will still be detrimentally affected however, if the degree of crushing varies down the length of the conductor, as will be the case if the compressibility of the insulation varies down the length of the conductor. The uniform foam cell size distribution and the uniformity in the insulation exterior surface of the present invention minimizes this variation in electrical properties by maintaining a consistent degree of compressibility along the conductor. This can be best achieved by having an insulation with small and highly uniform foam cells.

The uniform cell size of the foamable composition is such that less polymer is required to form an insulative material for a conductor. The uniformity and small foam cell size provide uniform dielectric for the insulation. There are additional benefits of the insulated conductor formed using the foamable composition of the present invention that includes: 1) When the foamed insulated conductor has the same thicknesses as that of an unfoamed, i.e. solid insulation, the electrical properties are improved because of the lower dielectric of the foamed insulation. 2) The foamable composition that gives small foam cell size and narrow foam cell size distribution, can be extruded to a smaller diameter and thickness while maintaining the electrical properties of foamed insulation than can compositions giving insulation with larger cell size and/or broader cell size distribution. The preferable thickness of the insulation for the insulated conductors using the foamable composition of the present invention ranges from 6-12 mils (150-300 μm). The variation in foam cell size (size distribution) should be narrow so that overly large cells are so infrequent as not to cause problems with crush resistance of the insulation and so that the insulation dielectric is uniform. 3) The reduced insulation thickness provided by the present invention makes possible the production of smaller diameter foamed insulated conductor. This uses less material by virtue of the smaller size and the replacement of some of the polymer with air in the foam cells. Furthermore, cable made from the smaller diameter foam insulated conductor is smaller also.

The foamable composition of the present invention is commercially advantageous in that it provides a fluoropolymer that can be used as an insulative material for an insulated conductor while maintaining or improving the electrical properties of the insulated conductor. When the foamable composition of the present invention is used for insulated conductors at the same diameter as that of a comparable solid composition insulated conductor, the electrical properties are improved in the foamable composition insulated conductor. When the foamable composition of the present invention is used in an insulated conductor to reduce the diameter size of the comparable solid composition insulated conductor, the foamable composition insulated conductor typically maintains the electrical properties of the comparable larger diameter solid composition insulated conductor. This advantage of the foamable composition also occurs in the overall cable when the foamable thermoplastic composition of the present invention is used in place of the solid fluoropolymer composition in the cable.

Figure 2A:
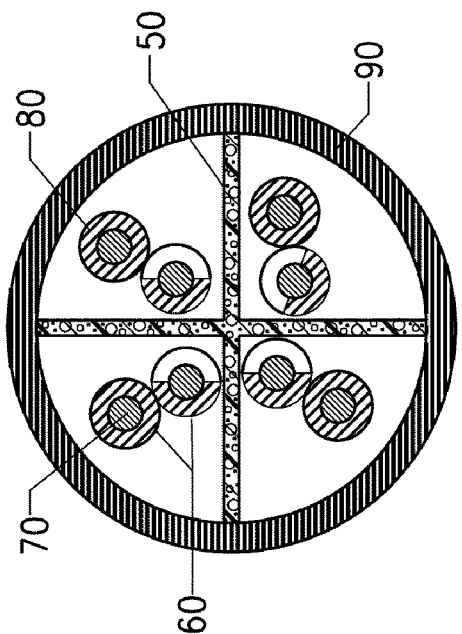
FIG. 2(a) shows a cross section of cable containing unshielded twisted pair and using a solid polymer composition.

Reference is now made to FIG. 2(a) which shows a cross-sectional view of four unshielded twisted pairs. A typical cable is shown which contains four twisted pairs 60 of insulated conductors, in which the pairs 60 are separated by a spacer or spline 40. A spline is any shape containing a central shaft and optionally, a series of radial projections or serrations. The spline 40 is made of a solid polymer composition. The multiple twisted pairs 60 are housed inside an outer jacket, sheath or covering made of polymer 90. The conductors 70 are each surrounded by insulation 80. Each twisted pair 60 is formed by two insulated conductors 70 wound around each other for the purposes of canceling out electromagnetic interference which can cause crosstalk. Twisting wires decreases interference because: the loop area between the wires (which determines the magnetic coupling into the signal) is reduced; and because the directions of current generated by a uniform coupled magnetic field is reversed for every twist, canceling each other out. The greater the number of twists per meter, the more crosstalk is reduced. A solid polymer is used for the polymer in the cable shown in FIG. 2(a).

Figure 2B:
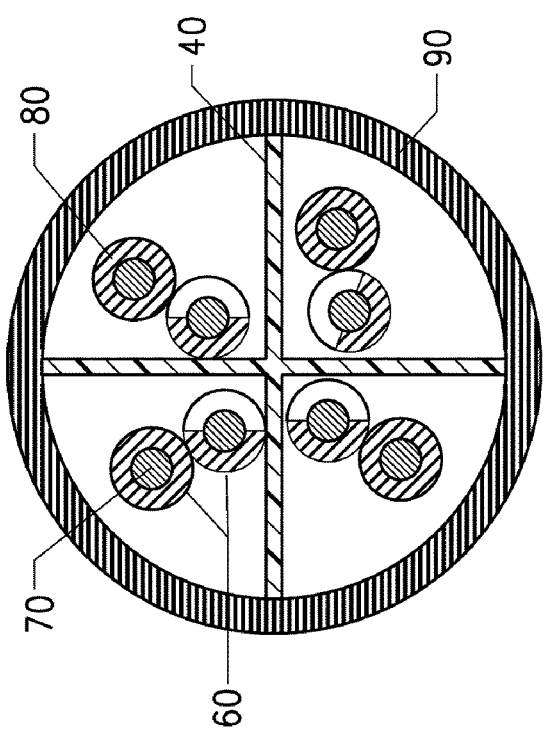
FIG. 2(b) shows a cross section of cable containing unshielded twisted pairs and using the foamed thermoplastic composition of the present invention.

All of the cable components can be smaller (e.g. smaller diameter) if a smaller insulated conductor is used in the cable. A smaller insulated conductor can be made by using the foamed thermoplastic composition of the present invention for one or more polymer components of the cable. For example, FIG. 2(b) shows the cross-sectional view of the four unshielded twisted pairs shown in FIG. 2(a), however, the spline 50 is made from the foamable composition of the present invention. By changing the spline from a solid polymer composition to the foamable composition of the present invention, the diameter of the cable can be reduced. This is shown in FIGS. 2(a) and 2(b) where the comparison of a typical cable with a solid polymer spline (FIG. 2(a)) relative to a spline using the composition of the present invention (FIG. 2(b)) shows a reduction in the cable diameter however, the electrical properties remained the same. Similarly, the foamable composition can be used in other components of the cable that use polymer such as the insulation 60 of the conductors and the jacket 90, to reduce the overall cable size while maintaining the electrical properties of the cable. By foaming the insulation material, the flexibility is increased and thus the electrical properties can be controlled.

In addition to the utility of the foamed composition of the invention as wire insulation, it may be used in making other foamed articles, such as tubing, splines (spacers) for separation twisted wire pairs in cable, foam sheeting, gasketing, and insulation, especially for use in conditions where the high temperature properties and thermal and chemical resistance of fluoropolymers are beneficial.

It is therefore, apparent that there has been provided in accordance with the present invention, a foamable thermoplastic polymer composition that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. A foamable composition for extruded foam insulation on a conductor, said insulation containing cells of uniform size concentrated towards the center of said insulation, whereby said insulation has a skin on its interior and exterior surfaces, said composition comprising: a) a partially-crystalline melt-processible fluorinated tetrafluoroethylene/hexafluoropropylene copolymer being substantially free of alkali metal ion, having less than about 20 unstable end groups per $10^6$ carbon atoms, and having a melt flow rate of from about 25 to 35 g/10 min, and b) a foam nucleating package providing said uniform foam cell size wherein the foam cell size of 90% of the foamed cells is 50 micrometers or less, and said foam nucleating package ranges from 0.1-10 wt % of the combined weight of said tetrafluoroethylene/hexafluoropropylene copolymer and said foam nucleating package, the extrusion of said foam insulation exceeding 500 ft/min, and wherein said foam nucleating package comprises i) boron nitride, ii) calcium tetraborate, and iii) a foam nucleating agent of the formula

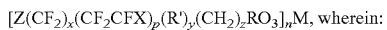

$[Z(CF_2)_x(CF_2CFX)_p(R')_y(CH_2)_zRO_3]_nM$, wherein:

Z is selected from $CCl_3$, $CCl_2H$, H, F, Cl or Br;
each X, independently, is selected from H, F or Cl;
R is sulfur or phosphorus;
M is H or a metallic, ammonium, substituted ammonium or quaternary ammonium cation;
x is an integer and is 0 to 10;
p is an integer and is 0 to 6;
y is 0 or 1;
z is an integer and is 0 to 10; x+y+z+p is a positive integer or, if x+y+z+p is 0, Z is $CCl_3$ or $CCl_2H$;
n is the valence of M; and
R' is selected from a $C_{5-6}$ perfluorinated alicyclic ring diradical; a $C_{1-16}$ perfluorinated aliphatic polyether diradical with repeat units selected from $[CF_2O]$, $[CF_2CF_2O]$, and $[CF_2CF(CF_3)O]$; and a substituted or unsubstituted aromatic diradical, in which Z is H.

2. The composition according to claim 1, wherein said tetrafluoroethylene/hexafluoropropylene copolymer is made by polymerizing monomers comprising tetrafluoroethylene, hexafluoropropylene and perfluoro(alkyl vinyl ether).

3. The composition of claim 1 wherein the tetrafluoroethylene/hexafluoropropylene copolymer is melt fluorinated.

4. The composition according to claim 1, wherein said tetrafluoroethylene/hexafluoropropylene copolymer is polymerized and isolated without the use of alkali metal ion containing reagents.

5. The composition according to claim 1, comprising a tensile strength of at least 2000 psi (13.8 MPa) and an elongation of at least 200%.

6. The foamable composition according to claim 1 wherein the extrusion of said foam insulation is at a rate of at least 1000 ft/min.

7. The foamable composition according to claim 1 wherein said tetrafluoroethylene/hexafluoropropylene copolymer contains 3 to 20 wt % of said hexafluoropropylene.

8. The foamable composition according to claim 7 wherein the extrusion of said foam insulation is at a rate of at least 1000 ft/min.

9. The foamable composition according to claim 1 wherein said foam nucleating agent of said foam nucleating package comprises the barium salt of $F(CF_2)_nCH_2CH_2SO_3H$, wherein n is selected from 6, 8, 10 and 12.

10. The foamable composition according to claim 1 wherein said foam nucleating package comprises 91.1±0.5 weight percent boron nitride, 2.5±0.2 weight percent calcium tetraborate, and 6.4±0.2 weight percent weight percent of the barium salt of $F(CF_2)_nCH_2CH_2SO_3H$, wherein n is selected from 6, 8, 10 and 12.

* * * * *